United States Patent [19]

Foldyna et al.

[11] Patent Number: 5,477,790
[45] Date of Patent: Dec. 26, 1995

[54] MULTISTAGE SYSTEM FOR SOLID WASTE BURNING AND VITRIFICATION

[76] Inventors: Joseph T. Foldyna, 301 Myrtle, Boise, Id. 83702; Stephen F. Schwilling, HCR 60 Box 282C, Bonners Ferry, Id. 83805

[21] Appl. No.: 321,119

[22] Filed: Sep. 30, 1994

[51] Int. Cl.$^6$ ........................................ F23G 5/12
[52] U.S. Cl. ..................... 110/346; 110/229; 110/211; 110/235
[58] Field of Search ..................... 110/211, 214, 110/229, 233, 235, 346; 588/205, 228

[56] References Cited

U.S. PATENT DOCUMENTS

| | | | |
|---|---|---|---|
| 3,917,239 | 11/1975 | Rhinehart | 110/215 |
| 4,179,263 | 12/1979 | Jung et al. | 432/1 |
| 5,213,051 | 5/1993 | Kaneko | 110/229 |

*Primary Examiner*—Denise L. Gromada
*Assistant Examiner*—Susanne C. Tinker
*Attorney, Agent, or Firm*—Wayne E. Duffy

[57] ABSTRACT

An improved method is provided, using existing technology, for treating and disposing of both classified and unclassified waste materials, in a multistage process having a plurality of integrated and interconnected primary and secondary combustion and exhaust systems and having a selective range of pressures and temperatures and fuel/oxygen ratios in each of the systems. The primary or first stage combustion system treats generally classified, predominantly organic waste material that is amenable to a low temperature degradation which produces flammable exhaust materials that are then used to fuel an operably connected high temperature torch which is integral to the secondary or second stage, high temperature combustion system. The high temperature system treats generally unclassified waste material, which may contain both organic and inorganic waste in random ratios. The high temperature flame from the torch is used to vitrify the unburned solids which remain, using added vitreous material whenever necessary and discharging the molten, vitrified waste into suitable containers for disposition, whenever appropriate. The exhaust gases from the high temperature stage are handled by conventional means. The multistage process may be operated either in batch or continuous mode.

7 Claims, 1 Drawing Sheet

MULTISTAGE SYSTEM FOR SOLID WASTE BURNING AND VITRIFICATION

BACKGROUND OF INVENTION

1. Field of Invention

This invention relates to a means and method for the integrated and controlled vaporization and burning and vitrification of solid wastes, using interconnected primary and secondary combustion and exhaust systems and having a selective range of temperatures, pressures and fuel/oxygen ratios in each of the integrated systems.

2. Description of Prior Art

Disposition of solid industrial and domestic waste has been the object of many inventive processes and has included numerous methods and means for burning the combustible components of the waste and separating the non-combustible parts for salvage or other disposition. Control of the effluents from the processes for economic, environmental or other purposes has resulted in many inventions. The utilization of the energy generated by the burning means to produce usable electric power has also been a source of many useful processes.

Many of the solid waste disposal systems described in the patent literature are designed and directed toward the burning and handling of specific types of solid materials, received from specific types of industrial and domestic sources. These frequently require the use of natural gas, petroleum, electricity in significant quantities to operate the systems. This affects the economy of the systems and sometimes limits their general usefulness. Furthermore, many of the solid waste disposal systems are quite complex in their design, construction and operation.

This invention is intended to provide, by the use of existing technologies, a simple and straightforward process and means whereby a plentiful and predictable supply of industrial waste can be controllably degraded to form fuel to be burned to implement the burning and vitrifying of the varied and random types of wastes often sent to public landfills or of other suitable industrial or domestic waste materials.

Furthermore, the invention is intended to greatly reduce or eliminate the need for special handling or treatment of toxic or undesirable solids from the process. This is achieved essentially by vitrifying the unburned solids, thereby enclosing them in a glassy envelope which, upon cooling, is buried or otherwise disposed.

Since vitrification usually requires temperatures in excess of 2,500° F., the effluent gases from the process are extremely hot and, depending upon their respective compositions, may be subject to high temperature reactions, decomposition and combustion. The treatment of these effluent gases involves use of standard, known procedures which are appropriate for the particular gas and may include, but are not limited to, condensation, absorption, adsorption, scrubbing and burning. Neither vitrification nor the standard effluent gas treatment procedures are novel and are not considered a part of this invention. Rather they are used to implement the invention. Utilization of any excess energy from this process for heating or co-generation of electricity is not considered a part of this invention but may be added at the discretion of the user for economic, environmental or other reasons.

SUMMARY OF THE INVENTION

This invention combines and integrates two different, standard combustion systems, in a two step process, first, to controllably and thermally degrade, combust and dispose of an easily identifiable, plentiful and controllable source of primarily organic waste and, in so doing, second, to provide a source of fuel to controllably combust and vitrify an equally plentiful, sometimes less identifiable source of waste which contains multiple organic and inorganic components in random ratios.

In the first standard combustion system the selected, primarily organic waste material, is preheated, using gas, oil, electricity or other suitable means, to initiate thermal degradation. When this becomes self sustaining the external heating is terminated. The process takes place at relatively low, controlled temperatures, in the range of 300° F. to 400° F., in a controlled, oxygen deficient atmosphere. The products of this thermal degradation, which consist principally of lighter hydrocarbons, accompanied by small amounts of carbonaceous particulate materials, are then introduced into the second standard combustion system. The first system has appropriate, controllable doors for the introduction of new waste and the removal of unburned residue.

The second standard combustion system utilizes a controlled oxygen sufficient or oxygen enriched atmosphere to attain the high temperatures in the heat source necessary, not only to combust virtually all of the combustible materials in the waste containing vessel but to vitrify any inorganic waste solids that are contained therein. When necessary, silica in the form of sand, ground glass or other available source, is added to the mixture, in a controlled manner, to facilitate the vitrification process.

The high temperature flame created in the second combustion system, which may range from ignition to 6,000° F., is formed using standard technology and is not a part of this invention. It provides for the mixing of the effluent gases and carbonaceous particles from the first system, with either external air or pressurized oxygen or both, in an appropriate mixing chamber. This is then ignited by appropriate means and the flame is directed toward the mass of waste material contained in the second combustion chamber. Standard safety procedures are observed for each system.

The second combustion chamber is a standard, ceramic lined, metal vessel which has a water cooled jacket surrounding the appropriate exterior surfaces, to dissipate or otherwise utilize excess heat. The vessel has an outlet to withdraw liquid, vitrified waste and one or more removable covers to introduce unburned waste and to remove any solid materials which may not have been vitrified during the operation of the system.

Control of the fuel/oxygen ratio in both the first and second combustion chambers is maintained by means of standard, appropriate sensors and valves and may be changed automatically or at the discretion of the operator to accommodate the nature of the waste material being treated.

The invention may be constructed to operate in the batch mode or it may be constructed to operate in a continuous mode, depending upon the requirements of the operator and the nature of the waste.

The preferred embodiments to be described herein will utilize discarded tires from automobiles and other vehicles as a waste fuel for the first standard, oxygen depleted, combustion system. Selected waste which is suitable for vitrification will be provided for the second, oxygen sufficient or enriched combustion system.

DESCRIPTION OF PREFERRED EMBODIMENT

Figure 1:
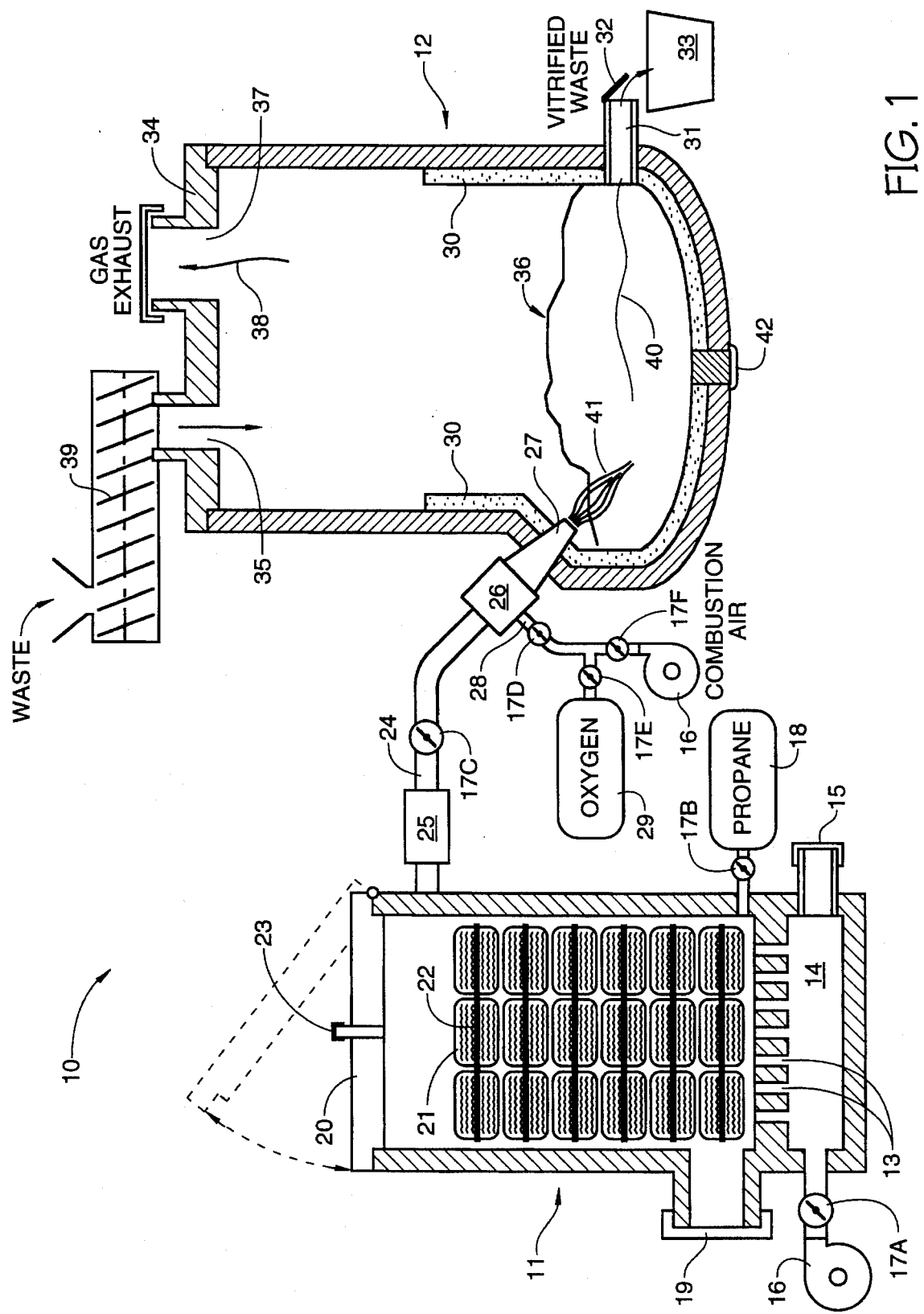
FIG. 1 shows a schematic side view of an existing preferred embodiment of a multistage batch type system for solid waste degradation, combustion and vitrification.

FIG. 1 shows a schematic side view of an existing preferred embodiment of a multistage, integrated, batch type system for solid waste degradation, combustion and vitrification and is generally designated by the number 10. It is comprised principally of a low temperature combustion chamber 11, which is operably connected to a high temperature combustion chamber 12.

The low temperature combustion chamber is of generally cylindrical shape, with the long axis vertically oriented, and constructed of suitable metal and with an integral, horizontal firegrate 13 in the lower part of the combustion chamber. Below the firegrate is an air distribution chamber 14 for the controlled introduction of external air and for the receipt of small debris and residue (not shown) from within the combustion chamber 11. A suitable, removable plug 15 is appropriately located on one side of the air distribution chamber 14 to remove, as needed, any such debris or residue.

Operably and externally attached to chamber 14 is a source of external air, supplied by a suitable fan 16 and controllable valve 17A for the controllable, oxygen depleted, combustion of the material to be thermally degraded and vaporized in combustion chamber 11. Also, operably and externally connected to the combustion chamber 11 and just above the firegrate 13, is a valve 17B controlled supply of propane 18 or other suitable combustible gas to provide the initial heat required to commence the controlled, low temperature degradation of the waste material to be burned in the combustion chamber 11. The propane is ignited initially by an electric igniter means (not shown).

Also, just above the firegrate and suitably located on one side of combustion chamber 11, is a controllable and sealable access door 19 to allow for the removal of unburned residue from the low temperature combustion of the material in chamber 11. Atop the combustion chamber 11 is a hingably and controllably attached cover 20 to enable the batch loading of waste material to be burned in the chamber.

In the existing preferred embodiment the waste selected to be combusted in the oxygen deficient atmosphere in combustion chamber 11 consists of discarded automobile tires 21. Current tire manufacturing technology includes the use of steel wire for the physical reinforcement of the millions of radial tires now being used on modern automobiles. The handling and disposal of this unburned residue becomes a significant factor in the burning of the tires and the possible recovery and use of the metal may have a substantial economic effect upon the entire operation.

Common practice in the preparation of discarded tires before burning includes loose loading of unchanged tires, shredding and, as shown in FIG. 1, tight packing of tires which have been cut radially on one side, flattened, rolled tightly and held together in individual rolls by combustible twine 22 or other suitable material and then stacked closely together in multiple parallel vertical columns in the combustion chamber.

Since this multistage waste treatment system is intended to employ the unburned waste gases from the low temperature, oxygen deficient, degradation and combustion of the tires to supply the energy for the second, high temperature combustion and vitrification process, it is desirable to have minimal exposed tire surface and minimal air available in the initial start up of the low temperature combustion process. These conditions allow greater operational control of the oxygen content and the combustion rate. Therefore the arrangement of the tires shown in FIG. 1 is one efficient choice, although other suitable arrangements may be obvious to those skilled in the art.

The top loading door 20 has appropriate safety pressure sensors (not shown) and controllable venting means 23 operably attached to prevent undue pressure increase in the low temperature combustion chamber during system operation. Also, suitable temperature sensors (not shown) are located at appropriate points within the low temperature combustion chamber to monitor the temperature range of the combustion as it proceeds. These standard safety and operational measures are not considered a part of this invention.

Extending generally horizontally and outwardly from one side and near the top of the low temperature combustion chamber and operably connected thereto is an exhaust line 24 to carry the combustion gases from the low temperature chamber into the interior of the high temperature chamber 12 where burning and vitrification of other, unclassified, solid wastes will take place under other controlled conditions, to be described.

Integral to the exhaust line and immediately following its connection to the low temperature combustion chamber is a standard back flash arrestor device 25 to prevent premature ignition of the evolving gases from the low temperature chamber. Following the back flash device and integral to the exhaust line is a standard controllable valve 17C to control the rate of flow of the exhaust gases into the high temperature chamber 12.

In the preferred embodiment the exhaust line then continues from the valve 17C outwardly and generally downwardly to connect operably with a standard gas mixing chamber 26. The mixing chamber, in turn, is operably connected to a standard high temperature burning tip 27 which extends sealably through one side of the lower side wall of and into the high temperature combustion chamber 12.

Operably connected to the gas mixing chamber 26 is a gas inlet line 28, to permit the valve 17D controlled introduction of operably connected, pressurized, external air 16 or oxygen 29 or a selected combination thereof, into the mixing chamber, to combine with the exhaust gases from the low temperature combustion chamber 11. Such selective control of the ratio of exhaust gases, air and oxygen, in turn, will control the combustion temperature at the high temperature burning tip 27 and ultimately the burning temperature of the waste, in the high temperature combustion chamber 12. This temperature may range from ignition to 6,000° F.

Wherever appropriate for safe and effective control and operation of either the low temperature or high temperature combustion system, valve 17 may include and incorporate suitable standard pressure control means (not shown).

The second, high temperature combustion chamber 12 is of standard design, constructed of suitable metal, of generally cylindrical shape and having a closed, slightly concave inner bottom surface and a vertical central, longer axis The high temperature region of the vessel, which extends approximately half way up the inner side of the chamber is suitably lined with ceramic material 30 to withstand the high operating temperatures. The outer surface of the chamber may be circumscribed with suitable cooling coils (not shown) to transport excess heat away from the chamber for other possible use or disposal.

A suitable, removable, properly insulated plug 41 is located appropriately in the bottom of chamber 12 to permit removal of unvitrified waste and general cleanup of the chamber.

On one side of the high temperature chamber 12, near the lower end, an exit port 31 is located, having a suitable controllable and sealable cover 32 to allow the controllable out flow of molten vitrified material from the burning process which takes place in chamber 12. The molten, vitrified material 40 is allowed to pass from the high temperature chamber into a suitable receptacle 33 for storage or disposal or other appropriate application.

The upper end of the high temperature chamber has an appropriate sealable and removable cover 34 which has a suitable inlet port 35 for the introduction of unclassified waste 36 to be burned and an exit port 37 for the controllable release of exhaust gases 38 from the burning process in the high temperature chamber. Operably and sealably connected to the waste inlet port 35 is a suitable, controllable worm drive waste introduction means 39 which permits the individual or simultaneous controlled introduction of waste or silica type material to implement the vitrification process in the high temperature combustion chamber. All of these standard components also include standard safety features for temperature and pressure control, (not shown) and are not considered a part of this invention.

As mentioned previously, the preferred embodiment as described herein, is a batch process. Since the high temperature combustion chamber is designed to operate on a relatively continuous basis, dependent largely upon the supply of burnable exhaust gases and high temperature flame 41 created from the first stage low temperature combustion system, it may be desirable to increase the number of low temperature combustion chambers which are operably attached to the high temperature system.

This is easily done by suitably locating a plurality of usually, but not limited to, three of such low temperature chambers about the periphery of the high temperature chamber, in parallel arrangement, so that they each, separately or together, can be operably connected to the single torch which heats the high temperature chamber or each low temperature chamber can utilize a separate torch and associated equipment which is similarly and operably introduced at an appropriate point into the high temperature chamber (not shown).

With such an arrangement the various low temperature combustion chambers can sequentially and selectively and separately be loaded, heated and unloaded at the discretion of the operator and the high temperature chamber can be operated relatively continuously, depending upon waste supply and maintenance requirements. The particular design of the system will depend upon the needs of the operator.

The heat content of typical automobile tires is in the range of 13,000 to 14,000 Btu/lb. The modern tire is generally composed of selective, often proprietary, combinations of natural and synthetic rubbers, often including cis-polyisoprene, with varying amounts of additives such as, but not limited to, carbon, plasticizers, activators, vulcanizing agents, binders, reinforcing fillers, aging inhibitors, extenders and, in radial tires, steel reinforcing wire.

When the tire undergoes thermal degradation in a temperature range between 300° F. and 340° F. in an oxygen deficient atmosphere this material evaporates, with a measurable amount of carbon particles or soot in the gas stream. The unburnable steel reinforcement wire is about 4% by weight and a small amount of coke, less that 1%, forms from the liquified fraction.

A typical composition of the gas evolving from the 300° F. to 340° F. temperature, oxygen deficient, tire degradation process is:

| | |
|---|---|
| Ethylene | 72.3% |
| Carbon Monoxide | 3.62% |
| Carbon Dioxide | 3.62% |
| Nitrogen | 20.39% |
| Carbon Soot | 4.39 gms/cu ft of gas |

One pound of a tire vaporized under such conditions will produce about 14 to 15 cubic feet of such gas at atmospheric pressure, with a heating value of about 1,200 Btu/cubic foot.

The temperature of combustion of this gas, at atmospheric pressure and normal oxygen concentration is about 2,500° F. When pure oxygen is mixed with the low temperature combustion exhaust gases, the temperature of the flame at the burner tip in the high temperature chamber may reach or exceed 4,000° F. This high temperature range assures the virtually complete combustion of all combustible materials in the unclassified waste in the high temperature combustion chamber and the vitrification of virtually all of the solids remaining unburned in the chamber. Of course, additional silica will be added, as necessary, in the form of sand or glass or other suitable material, to implement the vitrification process. The exhaust gases from this chamber can then be treated, if necessary, in a conventional manner and disposed.

The essential, novel feature of this invention, is that a plentiful, classified waste such as tires, plastics or other primarily organic materials amenable to low temperature, oxygen depleted, degradation, can be used to provide a combustible exhaust gas suitable as fuel in a high temperature, oxygen sufficient or oxygen enriched, combustion environment, which then will be able to burn unclassified, random waste and vitrify unburned solids that can then be collected in suitable containers and appropriately stored or otherwise disposed. Thus two common forms of waste, classified and unclassified, can be appropriately and efficiently handled, treated and disposed without the excessive use of other exhaustible forms of energy. Also, the excess energy derived from these two combustion processes chambers can be used for the production of electricity or other useful purpose.

The preferred embodiment described herein is a batch process. A continuous process also may be employed, using standard technology (not shown). When this is done the material being introduced into the low temperature chamber is usually shredded or pulverized and the controlled air inlet is then associated with the incoming material (not shown).

Described above is the application of standard means and a novel method for the treatment and disposal of both classified and unclassified waste in a multistage process wherein the low temperature degradation of the classified waste furnishes fuel for the high temperature combustion and vitrification of unclassified waste, using existing equipment and technology. Many variations and modifications may become obvious to those skilled in the art. However, the scope of the invention is not limited by the above described detail but only by the appended claims.

We claim:

1. A method of treating and disposing of both classified and unclassified waste materials in a multistage process using a plurality of appropriately and operably integrated and interconnected primary and secondary combustion and exhaust systems and having a selective range of pressures and temperatures and fuel to oxygen ratios in each of the systems and wherein a generally low temperature degradation of the classified waste placed in a primary combustion chamber furnishes fuel for generally high temperature combustion and vitrification of the unclassified waste placed in a secondary combustion chamber, using existing equipment and technology, including the steps of:

a) introducing a selected quantity of generally defined, classified, primarily organic waste which is amenable to low temperature degradation, into a suitable primary combustion system chamber having means for pressure and temperature and atmosphere control; and b) introducing a selected quantity of generally undefined, unclassified waste containing both organic and inorganic material in random ratios into a suitable secondary combustion system appropriately and operably connected to the primary combustion system and having means for pressure and temperature and atmosphere control; and c) heating the introduced organic waste in the primary combustion chamber by suitable means until thermal degradation commences and becomes self sustaining and then ceasing further supplemental heating; and d) simultaneously introducing into the primary combustion system an appropriate, selective, low oxygen to waste ratio atmosphere containing an amount less than 20% oxygen by volume and controlling thermal degradation of the waste and the rate of vaporization and evolution of low molecular weight, combustible products from the waste; and e) exhausting the volatile and combustible products of the thermal degradation of said waste, controllably, as gases and particulate materials, from the primary combustion system and into an operably connected, suitable, mixing chamber; and f) mixing the exhaust materials appropriately in said mixing chamber with an externally supplied concentration of oxygen selected from 20% to 100% by volume; and g) igniting by suitable means the mixed gases evolving from the mixing chamber at the tip of a suitable and operably attached torch which is appropriately and sealably located within an operably connected, secondary combustion system and creating a flame which is directed toward the unclassified waste contained therein; and h) igniting and burning the unclassified waste in said secondary system by means of said torch flame at a temperature sufficiently high to fully combust virtually all combustible waste materials therein; and i) adding sufficient vitreous material, to the unclassified waste as it is being introduced into the secondary combustion chamber, in an appropriate selective ratio to be able to form a molten envelope for any unburned solids waste which may remain after all combustible waste has been burned; and j) using the high temperature flame and heating the vitreous material and unburned solids waste to a sufficiently high temperature and melting said vitreous material and enclosing the unburned solids waste in a molten envelope; and k) allowing the molten, vitrified waste solids to flowably and controllably exit the high temperature combustion chamber through an appropriate, closable, sealable and controllable opening in said chamber and receiving said waste in a suitable external, fluidly connected container and appropriately disposing of said vitrified waste; and l) simultaneously exhausting all unburned waste gases from the secondary high temperature combustion chamber through a plurality of suitable, controllable openings for standard, appropriate and selective handling, treatment and disposition; and m) having standard, existing means for and selectively and, as needed, maintaining, cleaning, changing, loading, heating, cooling and discharging contents of each of said plurality of primary and secondary combustion chambers during the operation of the multistage waste treatment process; and n) having standard, existing, temperature and pressure and atmosphere sensors and controls appropriately and operably installed and connected to each of said plurality of primary and secondary combustion chambers and using said sensors and controls to monitor and control the integrated and individual and selective operation of each and all of the plurality of said combustion chambers of the multistage waste treatment process.

2. The method of claim 1 wherein:

a) the classified, primarily organic waste treated in the primary combustion chamber consists of vehicle tires which have been classified as waste; and b) the tires are generally composed of selective, often proprietary, combinations of natural and synthetic rubbers, often including cis-polyisoprene and varying amounts of additives such as, but not limited to, carbon, plasticizers, activators, binders, vulcanizing agents, reinforcing fillers, aging inhibitors, extenders and, in many radial tires, steel reinforcing wire; and c) a typical composition of the gas evolving from a 300° F. to 340° F. temperature, oxygen deficient, tire degradation process in the primary combustion chamber is ethylene 72.3%, carbon monoxide 3.62%, carbon dioxide 3.62%, nitrogen 20.39%, carbon soot 4.39 gms/cubic foot of gas; and d) one pound of a typical tire vaporized under such conditions will produce about 14 to 15 cubic feet of such gas at atmospheric pressure, having a heating value of about 1,200 btu/cubic foot and a burning temperature of about 2,500° F., at atmospheric pressure and normal oxygen concentration.

3. The method of claim 1, wherein the exhaust materials evolving from the low temperature degradation of the classified waste contained in the primary combustion chamber are selectively mixed in a suitable, operably attached, mixing chamber, with externally supplied air, to produce a flammable mixture, having a burning temperature which may selectively range from ignition to 4,000° F.

4. The method of claim 1, wherein the exhaust materials evolving from the low temperature degradation of the classified waste contained in the primary combustion chamber are selectively mixed in a suitable, operably attached, mixing chamber, with externally supplied pure oxygen to produce a flammable mixture having a burning temperature which may selectively range from ignition to 6,000° F.

5. The method of claim 1, wherein the exhaust materials evolving from the low temperature degradation of the classified waste contained in the primary combustion chamber are selectively mixed in a suitable, operably attached, mixing chamber, with a selective mixture of externally supplied air and pure oxygen to produce a flammable mixture having a burning temperature which may selectively range from ignition to 6,000° F.

6. The method of claim 1 wherein:
   a) a plurality of low temperature combustion chambers are appropriately and operably located about the periphery of a high temperature combustion chamber and operably connected to said high temperature combustion chamber in such a manner that the combustible exhaust materials from the plurality of low temperature chambers are operably, controllably, fluidly and selectively available, both individually and in plurality, to a high temperature torch in said combustion chamber so that the high temperature combustion chamber can operate in an essentially continuous mode by receiving a selective and continuous and controllable supply of combustible exhaust gases from the plurality of low temperature chambers, to burn the unclassified waste in the high temperature chamber and to vitrify the unburned solids therein, which have been selectively and quantitatively supplied to the high temperature chamber, during the operation of the multistage burning and vitrification process; and
   b) the plurality of low temperature combustion chambers are operably and appropriately connected to the high temperature chamber in a manner selected from: in parallel and connected to a single torch located within the high temperature chamber and, in parallel and each of the low temperature chambers is operably and appropriately connected to a separate individual torch located appropriately and operably within the high temperature chamber; and
   c) each of the low temperature chambers can be selectively and operationally connected and disconnected by means of appropriate valves and controls, from any connected high temperature chamber and any of the remaining plurality of low temperature chambers for loading, heating, cooling, cleaning and maintenance during the operation of the multistage system.

7. The method of claim 1 wherein the plurality of primary low temperature systems and secondary high temperature systems are selectively constructed using appropriate standard design, valves, sensors, controls and waste handling means and are combined and operably connected to each other in such a manner that the multistage treatment of classified and unclassified waste may be selectively operated in a combination of system modes chosen from primary batch/secondary batch, primary batch/secondary continuous, primary continuous/secondary batch, primary continuous/secondary continuous.

* * * * *